United States Patent [19]

Fujita et al.

[11] 4,339,769
[45] Jul. 13, 1982

[54] PHOTOGRAPHY APPARATUS FOR TELEVISION PICTURE

[75] Inventors: Toshiji Fujita, Niiza; Chihiko Yamada, Tokyo; Takeo Terashima, Shigi; Masaki Nojima, Urawa, all of Japan

[73] Assignee: Toppan Printing Co., Ltd., Tokyo, Japan

[21] Appl. No.: 159,846

[22] Filed: Jun. 16, 1980

[30] Foreign Application Priority Data

| Jun. 25, 1979 | [JP] | Japan | 54-79824 |
| Jul. 2, 1979 | [JP] | Japan | 54-83750 |
| Jul. 31, 1979 | [JP] | Japan | 54-97685 |
| Sep. 20, 1979 | [JP] | Japan | 54-121476 |
| Apr. 11, 1980 | [JP] | Japan | 55-48410 |

[51] Int. Cl.³ .................. H04N 5/78; H04N 5/84; H04N 9/02
[52] U.S. Cl. .................................... 358/6; 358/244
[58] Field of Search ............... 358/6, 9, 76, 244, 130, 358/252, 296–302; 313/474, 477, 478

[56] References Cited

U.S. PATENT DOCUMENTS

| 2,995,619 | 8/1961 | Freeman . | |
| 3,576,356 | 4/1971 | Hyman et al. | 313/478 X |
| 3,617,626 | 11/1971 | Bluth et al. . | |
| 3,636,251 | 1/1972 | Daly et al. | 358/297 |
| 3,643,021 | 2/1972 | De Blance . | |
| 3,647,951 | 3/1972 | Rose, Jr. | 360/14 |
| 3,752,906 | 8/1973 | Lowry | 358/6 |
| 3,939,491 | 2/1976 | Shigeta | 360/14 |
| 4,052,739 | 10/1977 | Wada et al. | 358/299 |
| 4,178,615 | 12/1979 | Shimooka et al. | 358/302 |
| 4,208,672 | 6/1980 | Ameen et al. | 358/6 |
| 4,231,061 | 10/1980 | Freeman | 358/244 X |

FOREIGN PATENT DOCUMENTS

2839248 3/1979 Fed. Rep. of Germany ...... 358/244

OTHER PUBLICATIONS

Lisk, "A Low-Cost Color-Television Film-Recording System", SMPTE Journal, vol. 88, Mar. 1979, pp. 157–160.

Primary Examiner—Bernard Konick
Assistant Examiner—Donald McElheny, Jr.
Attorney, Agent, or Firm—Bacon & Thomas

[57] ABSTRACT

A photography apparatus for television picture comprises a video tape recorder which detects a frame specifying signal recorded on an audio track corresponding to a frame image next to a predetermined frame image by a detecting head disposed before the audio head by a distance corresponding to one field in the direction of tape travel; a memory device for storing one frame image produced by the video tape recorder when the video tape recorder detects the frame specifying signal; an NTSC decoder for separating the signal stored in the memory into three primary color signals; a monochrome monitor for reproducing images corresponding to each of the three primary color signals produced by the NTSC decoder; and a camera with a vertically elongated aperture diaphragm for forming, on color film, multi-exposed images on the monochrome monitor through color filters passing only the respective primary color corresponding to each image.

15 Claims, 22 Drawing Figures

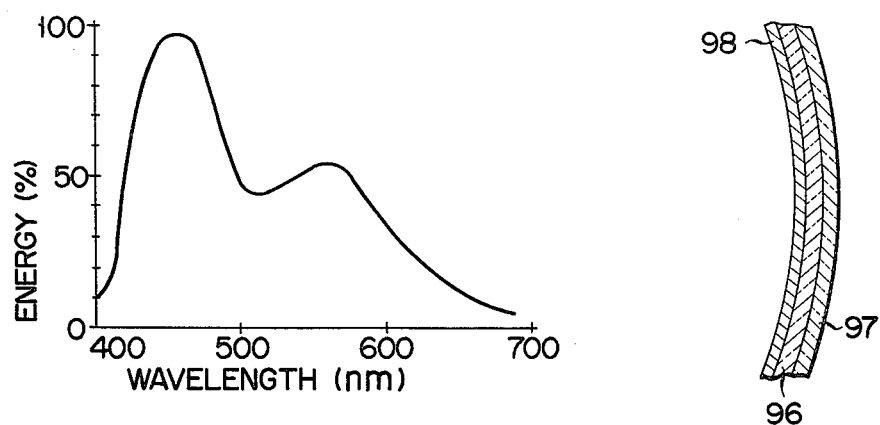
FIG. 7
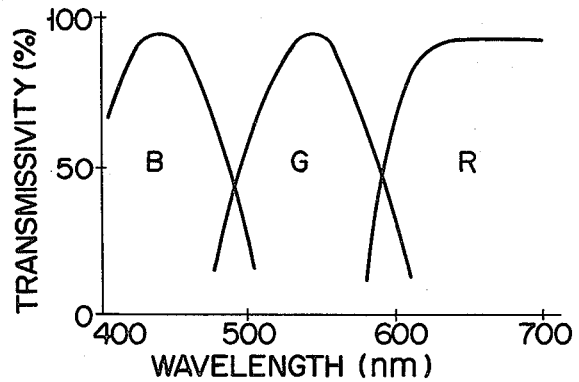
FIG. 8
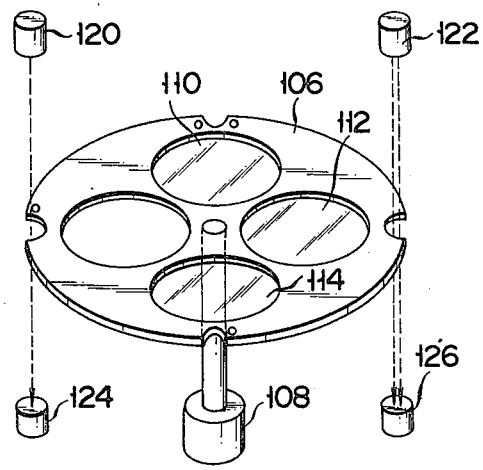

FIG. 15
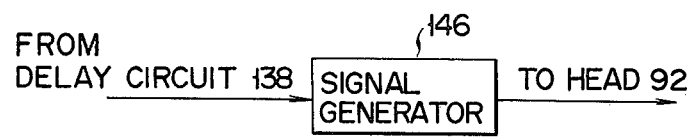
FIG. 16
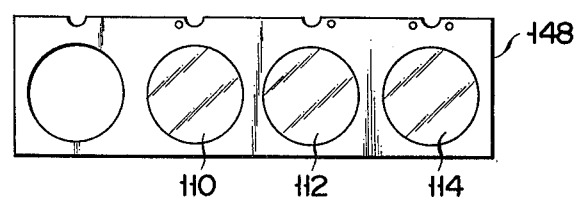
FIG. 17A  FIG. 17B  FIG. 17C
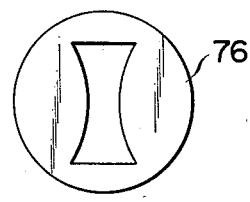 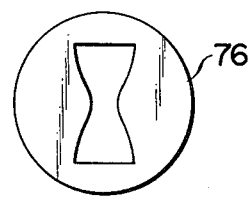 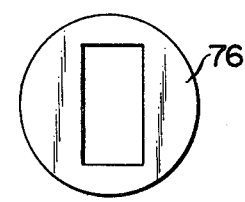

PHOTOGRAPHY APPARATUS FOR TELEVISION PICTURE

BACKGROUND OF THE INVENTION

The present invention relates to a photography apparatus for television picture and, more particularly, to a photography apparatus for taking photographs of television picture images for originals of printing.

A need has recently arisen for printing a desired television picture it in great numbers. For this purpose, in general, the image on the screen of a color television receiver is photographed by a still camera. The obtained color photograph is placed in an electronic color scanner for producing four color separation plates for color printing: a Y (yellow) plate, an M (magenta) plate, a C (cyan) plate and a BK (black) plate. Since the color television picture of the NTSC system is a moving picture of 30 frames per second, the shutter speed must be slower than 1/30 second for obtaining a photograph with a camera. The color temperature of the phosphorescent material painted on the screen of the cathode ray tube (CRT) of a television receiver is about 9,000° K. On the other hand, a color film is manufactured for general use in daylight, and its color temperature is in the range of 5,000°–6,000° K. Thus, a color temperature converting filter must be used for taking a photograph. However, since three kinds of phosphorescent material red, green and blue are painted on the CRT, the light-energy distribution of the phosphorescent material and the film-speed distribution of the film emulsion do not coincide, resulting in a color photograph which is unacceptable as an original. Further, since these phosphorescent materials of three different colors are painted in dotted form, does appear in the photograph and it is unacceptable in this respect, as well. That is, a photograph is enlarged beyond a certain degree, the dots become notable and resolving power is adversely affected. A television picture is constituted by 525 scanning lines regardless of the size of the picture and thus does not give a picture of good resolving power. Thus, the influence of the dots is fairly large.

Since the shutter speed must be considerably slow, the image may be blurred in photographing a fast-moving object, for example in photographing the images of a sport broadcast. Thus, it has been proposed not to directly photograph the television picture but to record the television signals by a video tape recorder (VTR) first, and then to photograph one frame picture reproduced by the VTR in the still frame mode. However, it is difficult to determine which frame to photograph among the frames recorded on one video tape. It is particularly difficult to determine which frame to print when the client and the printer are different and the client supplies a video tape with recorded television signals to the printer for printing. The client takes in advance a photograph of a predetermined frame to be printed with an instant camera and supplies the printer with this photograph and the tape counter value of the VTR read on an order mode. Then the printer determines which one is this predetermined frame by referring to this photograph and the counter value. However, several frames are included in one count of the counter. Accordingly, it is almost impossible for the printer to correctly determine the frame the client specified. It has also been proposed to record a time code signal representative of the hour, minute, second, and frame in an audio track of a video tape for specifying the frame. This time code signal can be generated by an already available SMPTE time code signal generator or a VITC signal generator. However, this type of signal generator is expensive, thus limiting the use of it. Further, the printer side must also have a detector for signals, resulting in an increase in cost both for the client and the printer.

SUMMARY OF THE INVENTION

The object of the present invention, therefore, is to provide an apparatus which can take a color photograph of a predetermined frame picture of a television picture recorded on a video tape recorder without degrading resolution, gradation and hue.

This object is accomplished by a photography apparatus for television picture which comprises video tape reproducing means which is capable of detecting a frame specifying signal which is recorded on a video tape at a position corresponding to a predetermined frame image during the playback mode; means for storing a frame image signal produced from the video tape playback means in response to the detection of the frame specifying signal, this means being connected to the video tape playback means; means for decoding the frame image signal read out from the storing means into three primary color signals and a luminance signal; scanning type monochrome monitoring means for converting an output signal from the decoding means into an image; and photographing means having an aperture diaphragm whose dimension in the direction perpendicular to scanning lines of the monitoring means is larger than its dimension along the direction of these scanning lines.

BRIEF DESCRIPTION OF THE DRAWINGS

FIG. 5 is a graph illustrating the light-emitting energy distribution of a screen of a monochrome monitor shown in FIG. 1;

FIG. 6 is a sectional view of the screen which is coated in multi-layer;

FIG. 7 shows the characteristics of a color filter shown in FIG. 1;

FIG. 8 is a perspective view of a filtering device shown in FIG. 1;

FIG. 15 is a block diagram of another modification of a video tape recorder at the frame specifying side;

FIG. 16 is a view illustrating another modification of the filtering device;

FIGS. 17A, 17B and 17C are views illustrating other shapes of the aperture diaphragm of the camera;

DETAILED DESCRIPTION OF THE PREFERRED EMBODIMENTS

Figure 1:
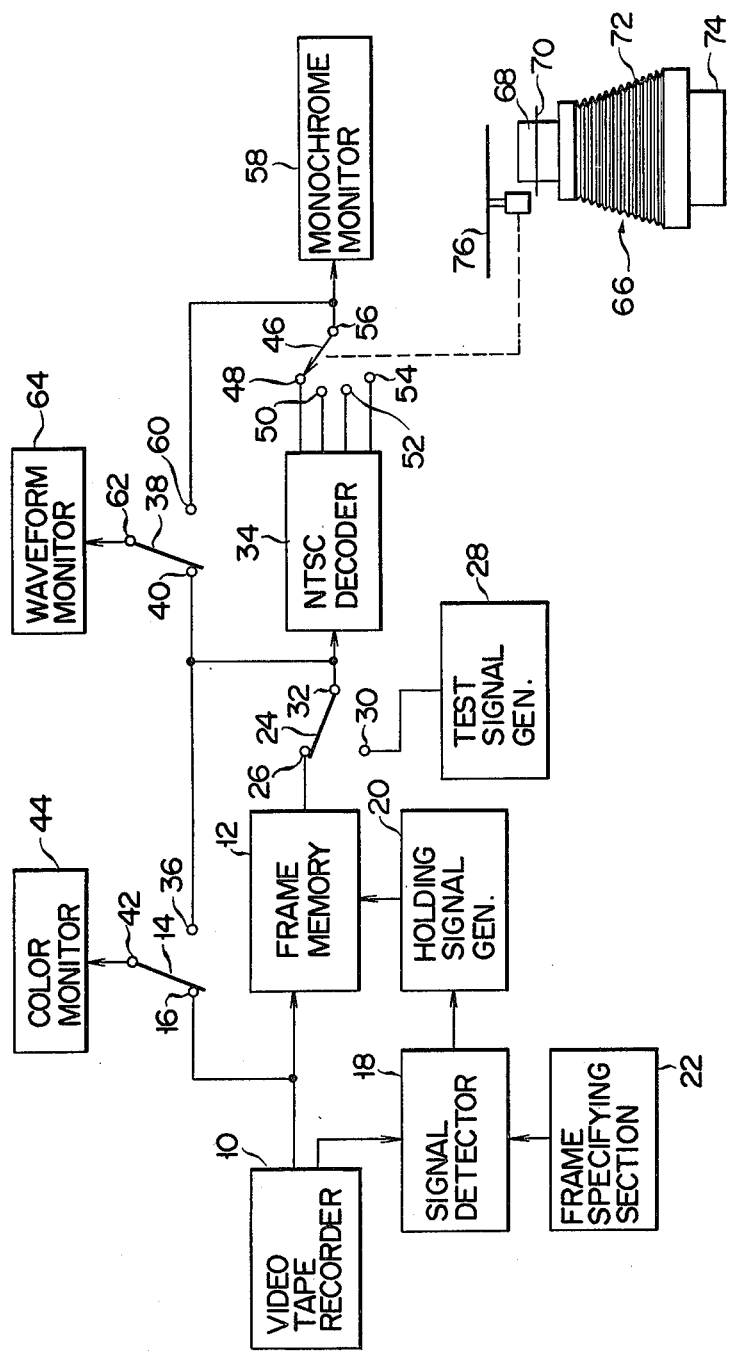
FIG. 1 is a block diagram of an embodiment of a photography apparatus for television picture in accordance with the present invention.

The first embodiment of a photography apparatus for television picture in accordance with the present invention will be described hereinafter with reference to the accompanying drawings. The electronic structure of this embodiment will first be described referring to the block diagram shown in FIG. 1. A video signal from a video tape recorder 10 (to be referred to as a VTR for brevity hereinafter) is supplied to a frame memory 12 which has a capacity of one frame picture. The frame memory 12 preferably is a digital type solid-state memory which A/D converts the video signal by sampling it at 3 or $4 \times f_{sc}$ MHz during the storing operation and D/A converts it during the readout operation. An analog type magnetic disk memory or a frame synchronizer with a freezing mechanism may alternatively be used. The video output terminal of the VTR 10 is also connected to a first movable contact 16 of a switch 14. A U-matic VTR of ¾ inch or 1 inch tape width for commercial use is used for the VTR 10. The playback output signal of the first channel CH-1 of the audio track of the ¾ inch tape is supplied to a holding signal generator 20 through a signal detector 18. The output terminal of a frame specifying section 22 is connected to the signal detector 18. The output terminal of the holding signal generator 20 is connected to a holding terminal of the frame memory 12. The output terminal of the frame memory 12 is connected to a first movable contact 26 of a switch 24. The output terminal of a test signal generator 28 is connected to a second movable contact 30 of the switch 24. The test signal is preferably a color bar ten step signal or a dotted pattern signal, etc. A stationary contact 32 of the switch 24 is connected to the input terminal of an NTSC decoder 34, a second movable contact 36 of the switch 14 and a first movable contact 40 of a switch 38. A stationary contact 42 of the switch 14 is connected to color monitor 44. The NTSC decoder 34 Y/C separates the color television signal and further separates the primary color signals R (red), G (green) and B (blue). The four output terminals of the NTSC decoder 34 giving the three primary color signals R, G and B and the luminance signal are, respectively, connected to the first through fourth movable contacts 48, 50, 52 and 54 of a switch 46. A stationary contact 56 of the switch 46 is connected to a monochrome monitor 58 and a second movable contact 60 of the switch 38. The monochrome monitor 58 may be a conventional CRT or a flying spot scanner tube. A stationary contact 62 of the switch 38 is connected to a waveform minotor 64. A still camera 66 is disposed in front of the screen of the monochrome monitor 58. The still camera 66 like a view-finder camera includes a lens 68, an aperture diaphragm 70, a body 72 and a camera back 74. This camera has multi-exposure capability. The aperture diaphragm 70 can be inserted from the outside and has a special shape as shown in FIG. 2. A focusing glass, a roll film holder, an instant film holder of the camera back 74 are replaceable. The camera also has a motor drive mechanism (not shown). The lens 68 is multi-layer coated. A filter device 76 is disposed in front of the lens 68, which will be described in detail hereinafter. The operation of the filter device 76 is synchronized with the change-over operation of the switch 46.

Figure 2:
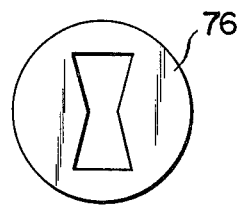
FIG. 2 is a view illustrating the shape of the aperture diaphragm of a camera shown in FIG. 1.
Figure 3:
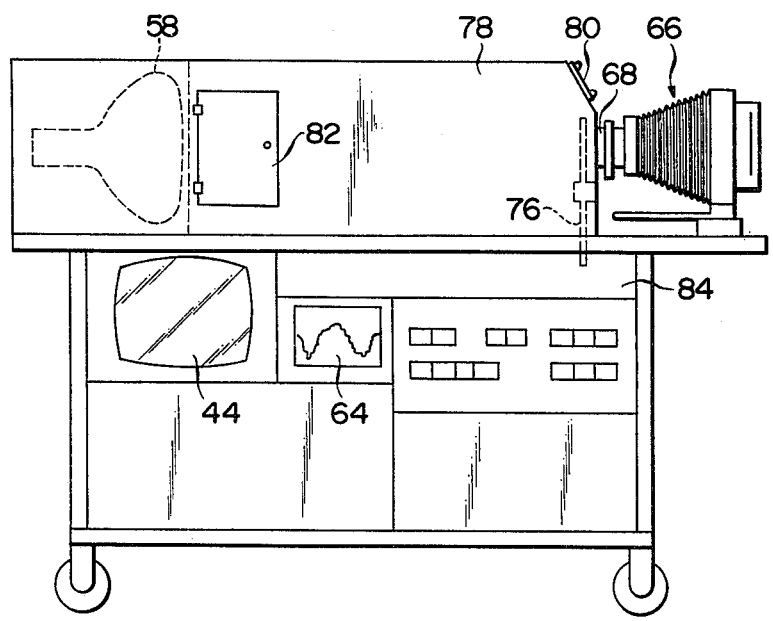
FIG. 3 is a view illustrating the outer appearance of this embodiment.

FIG. 3 is a side view illustrating an embodiment shown in FIG. 1. The apparatus is divided into an upper part and a lower part. The upper part includes photography system equipment; the lower part includes equipment for an electrical system. The darkness of the shadowed part of the images on the monochrome monitor 58 corresponds to the ambient brightness. The black and white contrast on the monochrome monitor at normal room brightness is approximately 1:30. As for color film, they express a contrast of over 1:300, thus they require a greater contrast on the monochrome monitor. Further, when image signals are recorded digitally at the frame memory 12, that is, by A/D conversion with 8-9 bits, the gradation of the image signals is much improved over that on the monitor. Therefore, the monochrome monitor 58 is placed inside a black box 78 which has a black, non-reflective inside surface. As a result, the contrast on the monitor becomes over 1:50. The lens 68 of the camera 66 faces the monochrome monitor 58 through an opening in a wall of the black box 78. The black box 78 has observation windows 80 and 82 through which the monochrome monitor 58 is viewed. The color monitor 44, the waveform monitor 64 and an operation panel 84 having the frame specifying section 22 is disposed on the side wall of the lower part of the apparatus. Other circuiting parts are disposed inside the lower part of the apparatus.

Figure 4:
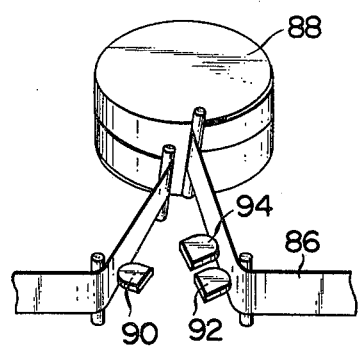
FIG. 4 is a schematic view illustrating a video tape recorder mchanism shown in FIG. 1.

The reproducing part of the VTR 10 will be described with reference to FIG. 4. A video tape 86 is wound around a rotary video head 88. An erasing head 90 contacts the tape before the tape contacts the video head 88 in the path of tape travel. Next to the video head 88 a detecting head 94 and an audio head 92 in contact with the first channel and the second channel, respectively, of the audio track of the video tape 86. The detecting hed 94 is disposed 1.59 mm before the audio head 92 in the path of tape travel. The speed of tape travel of the ¾ inch U-matic VTR is 95.3 mm/sec. The image of 1 field is recorded and reproduced in 1/60 second. Thus 1.59 mm of the tape travel is required for recording and reproducing the image of 1 field. Accordingly, the detecting head 94 is at the position of the audio track corresponding to the field immediately preceding the field to be reproduced by the audio head 92.

The monochrome monitor 58 must have a light-emitting energy distribution which is capable of multiexposing an image of three primary colors for color photography. Therefore, a P4 phosphorescent body is painted inside the screen of the monitor 58 which has the light-emitting energy distribution shown in FIG. 5. The P4 phosphorescent body is a mixture of ZnS, Ag+(Zn, Cd)S, and Ag, and the emitted light is white in color. The outside of the front glass 96 of the monochrome monitor 58 is multi-layer coated, as shown by its sectional view in FIG. 6. Since the thickness of the front glass is about 1 cm, where the front glass is not multi-layer coated, the light emitted by the electrons irradiated on the phosphorescent paint 98 is reflected toward the inside of the glass at the outside of the front glass due to the difference between the refractive indexes of air and glass. Consequently, the front glass is coated in a multi-layered form so that the refractive index gradually changes from that of glass to that of air from the outside of the front glass. With this construction, the television picture can be photographed without degradation in gradation.

The primary object of this embodiment is to take a color photograph based on the three primary color signals obtained from the NTSC decoder 34. Since three images are multi-exposed on film, filters of three colors (red, green and blue) are required. Wratten filters No. 25(R), No. 58(G) and No. 47B(B) manufactured by Kodak having the transmissivity characteristics shown in FIG. 7 are used here. The color temperature of the phosphorescent body of the monochrome monitor 58 is over 9,000° K. Thus, where the color film for daylight is used, although it is not shown, a color temperature conversion filter must be used in photographing. These filters are in a rotary arrangement as shown in FIG. 8. A disk 106 has four openings, and the center of this disk 106 is mounted on the shaft of a motor 108. Three primary color (R, G and B) filters 110, 112 and 114 as described above are disposed on the three openings of the disk 106. The remaining opening is left as it is. U-letter shaped notches are formed around the circumference of the disk 106 at positions corresponding to each opening. Small holes are formed at both sides of each opening. Two light-emitting elements 120 and 122 and two light-receiving elements 124 and 126 are disposed on both sides of the disk 106 for detecting the U-shaped nothes and small holes. The light-receiving element 126 has two light-receiving portions and these detect the small holes at both sides of the U-shaped notches.

Figure 9:
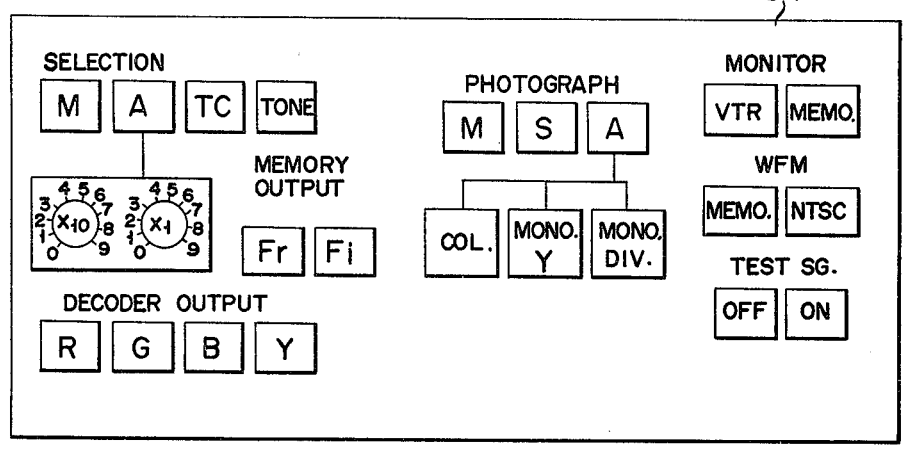
FIG. 9 is a front view of an operation panel shown in FIG. 1.

The details of the operation panel 84 are shown in FIG. 9. On this panel are disposed change-over buttons for switching between automatic and manual modes in specifying a frame to be photographed; frame specifying buttons for time code mode and tone signal mode; a frame number specifying dial in the automatic mode; a button for setting whether one frame or one field is used for reading out the information stored in the frame memory 12; change-over buttons for switches 14, 24, 38 and 46; a stand-by button for setting the conditions under which a photograph may be taken; a change-over button for switching between the manual and automatic modes in photographing; a photography mode setting button in the automatic mode to be described later, and so on.

The operation of this embodiment will now be described for taking a color photograph of a television picture. The specification of a desired frame of the television picture by the client will first be described. The video tape recorder for recording the television picture is the same type as the video tape recorder 10 used in the photography apparatus. Description will give to the case where a ¾" U-matic VTR is used. A variable low frequency generator is disposed and the signal generated from this is recorded as a frame specifying signal in the first channel of the audio track of the video tape. In the case of the U-matic VTR, the audio signal is recorded in the second channel and the first channel is available for this purpose. The client makes both a normal speed and a still frame playback, and determines the frame to be used for plate making. Then, a photograph of the still frame playback is taken by an instant camera. The value of the tape counter at this moment is also noted. This counting is initiated with the beginning of the tape winding operation. The still frame playback is interrupted and changed over to normal speed playback. An oscillator is activated to record the frame specifying signal of a predetermined frequency in the first channel of the audio track. The frame specifying signal is recorded in the field next to the one which was in contact with the video head when the VTR was changed over from still frame playback to normal speed playback.

The operating time of the oscillator, that is, the recording time of the specifying signal need only be enough for the holding signal generator 20 shown in FIG. 1 to detect this signal. The maximum length of it is the length which would not overlap with the next frame to be printed. It is set to be about 1/60 second here. However, when this does not overlap with the next frame, and when continuous frames are specified, it is hard to separate and detect these frame specifying signals. For example in photographing moving subjects such as a flower arrangement, or people engaging in sports, the movement of the subject is sometimes "selected", depending on the movement. In this case, 30 frames of the image per second are obtained for the television image. Thus, it is advantageous that a required image may be selected from more images than in the case when a 35 mm motor drive camera is used. The selected frame is numbered and the oscillating frequency is changed according to the number. As an example, a frame specifying signal of 400 Hz is designated for the first frame image, and the frequency is increased by 50 Hz for each signal. Further, if the client sets the number of the frame by a rotary switch or the like, the oscillation frequency of the oscillator is changed.

The video tape with the recorded frame specifying signal, and an order form with the photograph of the specified frame image, the number of the frame and value of the tape counter are supplied to a plate maker. The manner according to which the plate maker takes a color photograph for plate making with the photography apparatus shown in FIG. 1 will be described. The tape is mounted in the VTR 10, a desired frame number is set at the frame specifying section 22 and the VTR 10 starts normal speed playback. When the frame number is set by the frame specifying section 22, the band-pass frequency of the signal detector 18 is varied according to the frame number. The central band-pass frequency of the signal detector 18 is equal to the oscillating frequency of the oscillator of the client side. In the normal speed playback mode, the switch 14 is at the first position where the VTR 10 is connected to the color monitor 44. The playback picture is projected on the monitor 44. The first channel output signal of the audio track of the VTR 10 is supplied to the holding signal generator 20 through the signal detector 18. Thus, only the signals of the specified frames of the frequency corresponding to the specified number are detected by the holding signal generator 20. The timing is such that the time when the frame specifying signal is detected corresponds to the time when the frame image next to the frame image specified by the client is reproduced. However, since the detecting head 94 is disposed one field prior to from the audio head 92, the specified signal is detected when the frame image specified by the client is reproduced. When this frame specifying signal is detected by the holding signal generator 20, the holding signal is supplied to the frame memory 12, and this one frame image signal is stored in the memory 12. Since the signal detector 18 is included, the desired frame image alone can be obtained with precision even when continuous frames are selected.

The VTR 10 is capable of still frame playback. However, this still frame is a field image. Since the television picture image is a frame image obtained by interlacing of two field images, this stationary image of the VTR 10 is not suitable for photographing. Therefore, the image signal of one frame (two fields) is once stored in the frame memory 12, and the readout signal from this is used for photographing. The switch 24 is changed over to the first position, and the frame memory 12 is connected to the NTSC decoder 34. The frame memory 12 supplies 30 still frame images to the NTSC decoder 34 per second. The output signal from the memory 12 is supplied to the waveform monitor 64 by changing-over the switch 38 to the first position for monitoring the signal waveforms and also is supplied to the color monitor 44 by changing-over the switch 14 to the second position for monitoring the stationary frame image. Correction is made by the NTSC decoder 34 when required, and the output signal of the NTSC decoder 34 is supplied to the waveform monitor 64 by changing-over the switch 38 to the second position for observation of the separated signals R, G, B and Y.

Each output signal of the NTSC decoder 34 is supplied to the monochrome monitor 58 through the switch 46, and the image projected on the monochrome monitor 58 is photographed. Thus, the dots of the three color phosphorescent body are not projected, and the resolution is not degraded unlike in the case when the color monitor is used. Since the monochrome monitor 58 is in the black box 78, the black and white contrast is set to have sufficient gradation. However, it is preferable to set the contrast suitable for photographing before taking a photograph. The switch 24 is changed over to the second position, and the output signal (10 step signal) from the test signal generator 28 is supplied to the monochrome monitor 58. The brightness of the black portion of 0% brightness and the white portion of 100% brightness on the monochrome monitor 58 is measured by a spot meter through the observation windows 80 and 82 of the black box 78 for setting the predetermined brightness and contrast of the monochrome monitor 58 with respect to the 10 step signal. In focusing with a camera, the dot pattern signal is generated from the test signal generator 28 and is projected on the monochrome monitor 58.

Figure 10A:
FIGS. 10A and 10B are views illustrating the intensity distribution of a photograph in the vertical direction when the photograph is taken using a rectangular aperture diaphragm and an aperture diaphragm of the shape shown in FIG. 2, respectively.
Figure 10B:
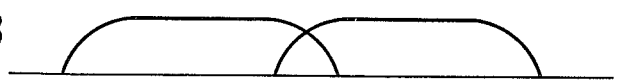

The image on the monochrome monitor 58 is constituted by scanning lines running transversely of the screen, as in the case of a usual television receiver. Thus, in general, the space between the scanning lines has no signal and is black. The black portion is clearly appeared in the photograph. In order to prevent this, the vertical energy distribution of the screen is widened by one scanning line and overlapped with the adjacent scanning lines; the part without a signal is thus eliminated. For overlapping the scanning lines, a photograph is taken slightly out of focus. However, when the focusing is incorrect, the resolving power is degraded. Thus, the de-focusing must be made only to the degree that the resolving power is not significantly degraded. This range is determined in the following manner. When a 35 mm film is used, the film size is 24 mm in length and 36 mm width. Since the ratio of the width to the length of the screen of the monochrome monitor 58 is actually 3:4, the horizontal film length of one frame image is 32 mm. Since the vertical direction is constituted by 525 scanning lines, the resolving power in the horizontal direction is 700 scanning lines for a length of 32 mm ($525 \div 24 \times 32 \approx 700$). For overlapping the scanning lines without degrading the resolving power, de-focusing is made only in the vertical direction and not in the horizontal direction. Since the width of the focus in the horizontal direction is 50 $\mu$m ($=32$ mm/700), that in the vertical direction is set about 100–150 $\mu$m. For this purpose, the shape of the aperture diaphragm is vertically elongated as shown in FIG. 2. In general, the value of the aperture diaphragm becomes larger as the area of the opening of the aperture becomes smaller. The depth of field becomes longer as the value of the aperture becomes larger. For example, when a Linhof Technica 4"×5" camera with a lens Apo-Nikkor of f:180 mm and a maximum aperture of F=9 are used, the shape of the aperture diaphragm is rectangular: 20 mm in length and 4 mm in width. The F number in the vertical direction of the screen corresponds to F=9 and that in the transverse direction corresponds to F=45. The F number for determining the actual exposure is F=24 according to the area of the aperture diaphragm. The scanning lines can be eliminated for photographing by changing the depth of field in the vertical and horizontal directions. In this condition, the focusing is within the depth of field in the horizontal direction, but it can be out of the depth of field in the vertical direction so that the blurring of the image is unnoticeable. The energy distribution on the film by the rectangular aperture diaphragm becomes relatively sharp as shown in FIG. 10A. Accordingly, the scanning lines must be widely overlapped to eliminate their appearance on the film. The distance of the film in the vertical direction is plotted along the abscissa in FIG. 10A. However, the energy distribution with a vertically elongated aperture diaphragm having a central narrowed portion as shown in FIG. 2 becomes as shown in FIG. 10B. As a result, the same effect can be obtained with about $\frac{1}{3}$ of the overlap, that is, the de-focusing as compared with using a rectangular aperture diaphragm. The dimensions of the aperture diaphragm shown in FIG. 2 are 20 mm in length and 8 mm in width, with a 4 mm width at the central narrowed area. This corresponds to the F number of F=9 in the horizontal direction, F=22 in the transverse direction, and F=45 in the horizontal direction at the central part. The camera may be de-focused either before or behind the true focal point. However, experiments have shown that better results are obtained by focusing behind the subject.

Figure 11:
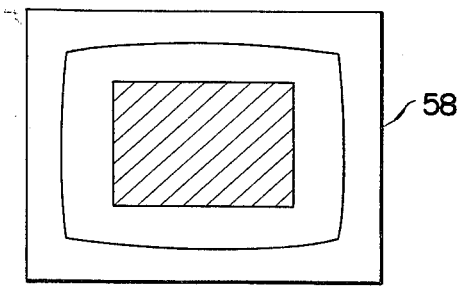
FIG. 11 is a view illustrating the range of the screen of the monochrome monitor actually used in the photography.

For taking a color photograph using a monochrome monitor 58, three primary color signals are projected on the monochrome monitor 58 and each image is made to pass through a color filter for multi-exposure on a film. The deflection angle of the monochrome monitor 58 is, in general, as wide as 90°–114°, and the phosphorescent face is curved so that the brightness of the phosphorescent face is not uniform. Thus, the range to be photographed by a camera is the central part alone and not the entire phosphorescent face as shown by the oblique lines in FIG. 11. When a 14 inch type CRT is used, for example, the maximum range on the screen in which the brightness is noticeably uniform for taking a photograph is about 150 mm×200 mm. Further, the focusing can be made convenient by making the screen smaller.

The filter device 76 is, as shown in FIG. 1, synchronized with the change-over of the switch 46 at the output side of the NTSC decoder 34. The photograph can thus be taken either in the manual or in the automatic mode. In the manual mode, the filter device 76 and the switch 46 are not synchronized and can be set arbitrarily. In general, the manual mode is utilized for photographic confirmation or test photography with an instant camera. In accordance with this embodiment, three kinds of photography are possible: three-color synthesized color photography with three primary color signals; monochrome photography by a luminance signal; and monochrome photography using three primary color signals and a luminance signal for making four color separation plate. The procedure of taking a photograph in the automatic mode will be described hereinafter.

First the operation of the three-color combined color photography will be described. After the brightness setting of the monochrome monitor 58 and the adjustments for photography are completed, the stand-by button on the operation panel is depressed, and the switch 46 and the filter device 76 in the manual mode are set in a predetermined position. That is, the switch 46 is connected to the fourth position for supplying the luminance signal of the NTSC decoder 34 to the monochrome monitor 58, the motor 108 of the filter device 76 is rotated, and an opening with no filter among the openings of the disk 106 is set to be in front of the camera lens. If the shutter is open, it is made to close. When the color photography button is depressed, the motor 108 of the filter device 76 rotates, the red color filter 110 moves into position in front of the lens, the switch 46 is connected to the first position and the red color output signal from the NTSC decoder 34 is supplied to the monochrome monitor 58. The rotation of the motor 108 is controlled by a mechanism according to which the light emitted from the light-emitting element 120 is received by the light-receiving element 124 through the U-shaped notches of the disk 106. Whether or not required filter is used is detected by the existence of small holes at both sides of the U-shaped notch. For example, if two beams of light from the light-emitting element 122 are not received by the light-receiving element 126, it is judged that the disk opening with no filter is in front of the lens. The shutter of the camera body 72 then opens, and the color film is exposed by the red color signal. The exposure of the camera 72 is automatically controlled. When the shutter closes, the switch 46 is changed-over to the second position, and the green color output signal of the NTSC decoder 34 is supplied to the monochrome monitor 58. The filter device 76 is so set that the green color filter 112 is in front of the lens. The shutter operates again and the film is multi-exposed over the red image by the green color signal. The film is also multi-exposed thereover to the blue image in a similar manner. A photograph is thus taken and the film is automatically wound. For taking another photograph continuously, the next image is stored in the frame memory 12, the still frame image is read out from the frame memory 12. The image on the monochrome monitor 58 is confirmed through the window 80, if necessary, the luminance signal is supplied to the monochrome monitor 58, the filter device 76 is made to be without filters, focusing and test photography are performed. The stand-by button is depressed, the automatic photography button is depressed and a photograph is taken in the similar manner as described above.

The manner according to which a monochrome photograph is taken with the luminance signal will be described hereinafter. Instead of a roll of color film, a roll of black-and-white film is mounted in a camera. The monochrome button is depressed after the camera is placed in the stand-by condition. The filter device 76 is in the condition in which the opening with no filter is in front of the camera lens. The switch 46 is connected to the fourth position, the luminance output signal of the NTSC decoder 34 is supplied to the monochrome monitor 58, and an image is exposed on the black-and-white film with the luminance signal. After the photograph is taken, the film is automatically wound.

The manner according to which four-color separation photography using black-and-white film for making four-color separation plates for color printing will be described hereinafter. Similarly as in the case of color photography, the camera is set in the stand-by condition and the button for monochrome separation photography is depressed. Then the red primary color signal is supplied from the NTSC decoder 34 to the monochrome monitor 58 so as to expose the black-and-white film to a red color image. The image corresponds to a C (cyan) plate for color printing. Unlike the case of color photography, after the image of one color is taken, one frame of the film is automatically wound. The other two primary color G, B images are photographed in a similar manner. The images correspond to the M (magenta) and Y (yellow) plates. The image with the luminance signal is also photographed and corresponds to the BK (black) plate.

Thus, in this embodiment, color photography of color television signals, monochrome photography, and four-color separation photography in black-and-white can be automatically accomplished. For color printing a television picture, the color photograph is fed to a color scanner for color separation to obtain separation plates of four colors, or a monochrome photograph resolved into four colors can be used.

The present invention is not limited to the embodiment described above, and modifications of each part will hereinafter be described referring to the attached drawings.

Figure 12:
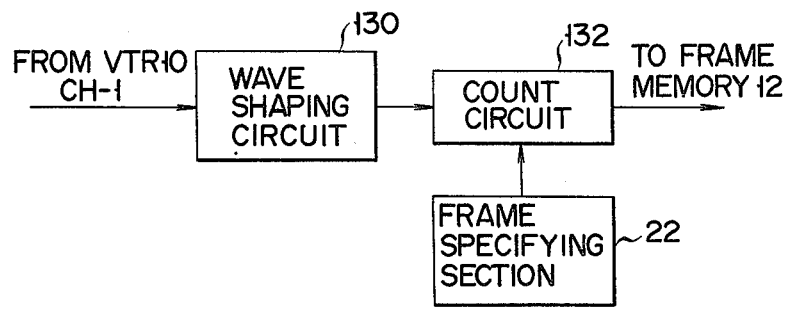
FIG. 12 is a block diagram illustrating a modification of the detecting portion for a frame specifying signal.

In the above embodiment, a low frequency was recorded as the detecting signal for frame specifying. However, pulses may be recorded instead. For this purpose, the VTR at the client side has a pulse generator for generating pulses of over 1/60 second in pulse width. When a certain still frame image is selected and converted from still frame playback to normal speed playback, a pulse is recorded in the first channel of the audio track of the video tape. Reproducing a video tape with a pulse recorded in this manner requires a VTR to which a detecting part as shown in FIG. 12 is connected. The output signal provided from the first channel of the audio track of the VTR 10 is supplied to a count circuit 132 through a waveform-shaping circuit 130. The count circuit 132 counts down from an initial value set by the frame specifying section 22. An output pulse is generated from the count circuit 132 when the counted value is 0. The output pulse of this count circuit 132 is supplied to the frame memory 12 as a holding signal, and at this moment one frame image is stored in the memory 12. The pulse recorded in the first channel does not include the information about the number of the specified frame. Thus, a frame specification from the client includes numbers in a specified order. The initial values of the counter 132 are set at the frame specifying section 22 according to these numbers. Further, a low frequency signal of about 1,000 Hz may be recorded for a certain period of time in the audio track of the video tape. In this case, the playback output signal is supplied to the waveform-shaping circuit 130 shown in FIG. 12 through a low frequency signal detecting circuit. Thus, the low frequency signal can be supplied to the count circuit 132 converted as a pulse signal.

Since the detecting signal is recorded in a position of the audio track one field next to the specified frame image, the detecting head 94 of the VTR 10 is displaced forward in the direction of tape travel from the audio head 92 a length corresponding to the period of time required for the recording and playback of one field image in the above embodiment. If the position of the audio head of the VTR at the client side may be disposed 1.59 mm (the distance of the tape travels in recording and reproducing one field) back from the normal position, the normal audio head may be used as the detecting head in the print maker side.

Figure 13:
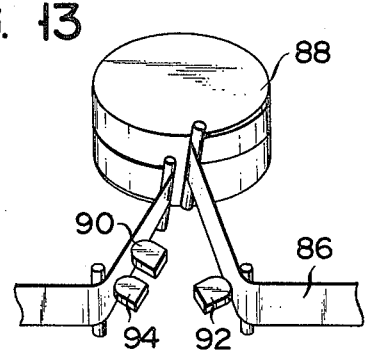
FIG. 13 is a schematic view illustrating a modification of a video tape recorder at the frame specifying side.
Figure 14:
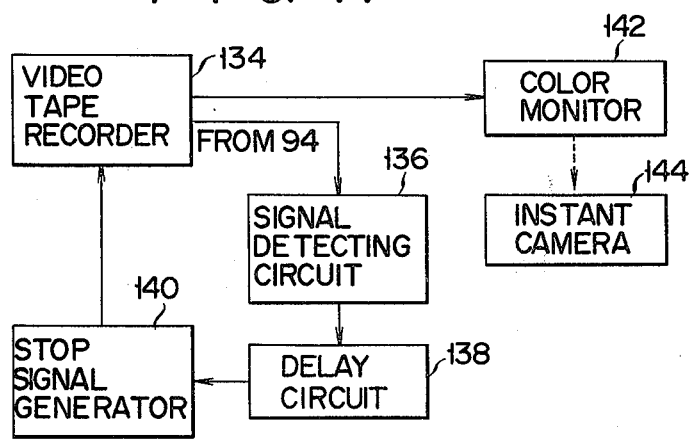
FIG. 14 is a block diagram of the video tape recorder shown in FIG. 13.

In the specifying methods described above, the client cannot reconfirm the frame images he specified. A detecting head may be included in the VTR at the client side for this purpose. Since the client records the detecting signal in the field next to the specified frame, the detecting head is disposed 1.59 mm before the audio head, a distance corresponding to one field. In case the detecting head cannot be disposed in the vicinity of the audio head, the detecting head 94 may be disposed in the vicinity of the erasing head 90 as shown in FIG. 13. FIG. 13 is a schematic view illustrating part of the head of the VTR in the client side, and the same parts are indicated by the same numerals as in FIG. 4. In cases when the detecting head 94 is disposed in front of the normal position with respect to time, the detecting timing must be delayed so as to produce a correct timing for interrupting tape travel. The circuit diagram is shown in FIG. 14. The playback output signal of the audio track of the VTR 134 of the client is detected by a signal detecting circuit 136. The detected signal triggers a stop signal generator 140 through a delay circuit 138 so as to interrupt the tape travel of the VTR 134 after the predetermined delay from the detecting timing. The delay time of the delay circuit 138 is the value obtained by the subtraction of the time period from the time of generation of the stop signal to that of stop of the tape travel, from the time period required for the tape to travel from the detecting head 94 to the audio head 92. After the specified frame image is thus reconfirmed, it is projected on a color monitor 142. The client takes a photograph of this with an instant camera 144. This facilitates the precise specification of frames.

The use of a delay circuit may be applied to the VTR at the print maker side. For example, in the case of a ¾ inch U-matic VTR of 95.3 mm/sec tape speed, the delay time is the value obtained by the subtraction of 1/60 second from the time period required for the tape travel from the detecting head 94 to the audio head 92.

Another method for specifying the frame will be described hereinafter. In the example described above, the detecting signal recorded on the tape is recorded in the position corresponding to the frame next to the specified frame. However, the detecting signal may be recorded again at a position one field prior to the field in which the client recorded the detecting signal. For this purpose, as shown in FIG. 15, the output signal of the delay circuit 138 is supplied to a frame specifying signal generator 146, and the frame specifying signal from this is supplied to the audio head 92. The detecting signal already recorded is detected by the detecting head 94 and the frame specifying signal is newly recorded by the audio head 92 at the position one field prior to the position it was initially recorded. The specified frame image may be easily photographed at the print maker side without using a VTR of special construction.

The frame specifying signal need not be a low frequency signal or pulse signal, it thus may be a high frequency signal of over 10 KHz. When signals are recorded in both the first and second channels of the audio track, a signal of a frequency other than audible band is superposed. The track in which the frame specifying signal is to be recorded need not be the audio track and thus may be the control track, the V blanking area of the video, or a cue track. For example, in recording in the control track, since rectangular wave signal of 29.97 Hz is already recorded in the control track, a signal of a frequency which may be separated by a filter or the like must be superposed.

Another modification of the color filter device 76 is shown in FIG. 16. In this modified example, three color filters 110, 112 and 114 and an opening without a filter are arranged in a row on a plate 148. This plate 148 is automatically displaced as in the embodiment described above, and a desired color filter is set in front of the camera lens by a motor, etc. Each color filter is recognized by the U-shaped notches formed on one end of the plate and the small holes formed at their sides.

The shape of the aperture diaphragm for eliminating the scanning lines on the monochrome monitor 58 is not limited to the example shown in FIG. 2 and may take forms as shown in FIGS. 17A, 17B and 17C.

Figure 18:
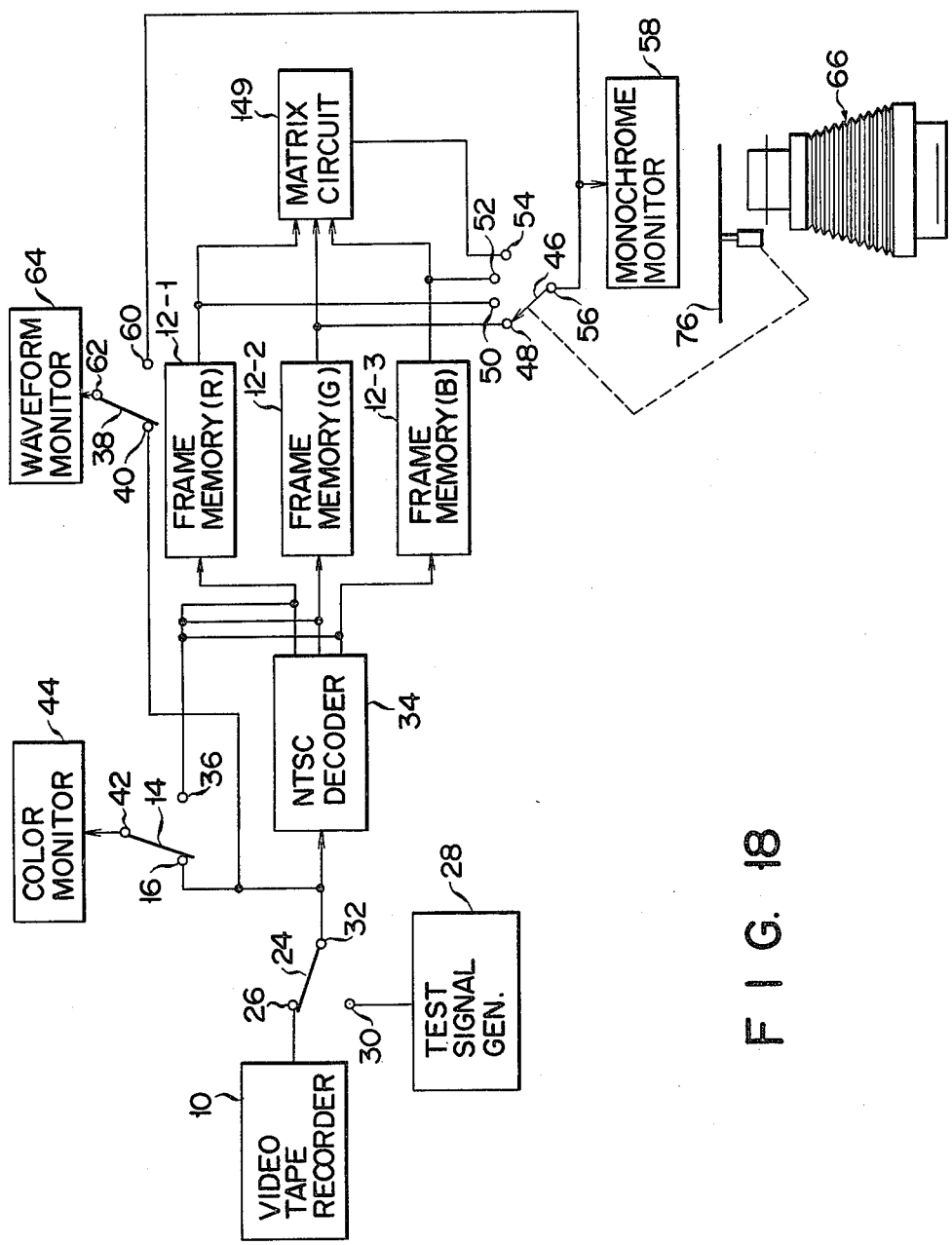
FIG. 18 is a block diagram illustrating a modification of the first embodiment.

In the embodiment shown in FIG. 1, the NTSC decoder 34 is disposed after the frame memory 12. However, as shown in FIG. 18, the NTSC decoder 34 may be disposed before frame memories 12-1, 12-2 and 12-3. Since the three primary color signals are obtained by the NTSC decoder 34, frame memories 12-1, 12-2 and 12-3 must be provided for each primary color signal. The luminance signal is synthesized by supplying the three primary color signals to a matrix circuit 149. Each of the output signals from the frame memories 12-1, 12-2 and 12-3 and the matrix circuit 149, as in the first embodiment, are supplied to a monochrome monitor 58 through a switch 46.

Figure 19:
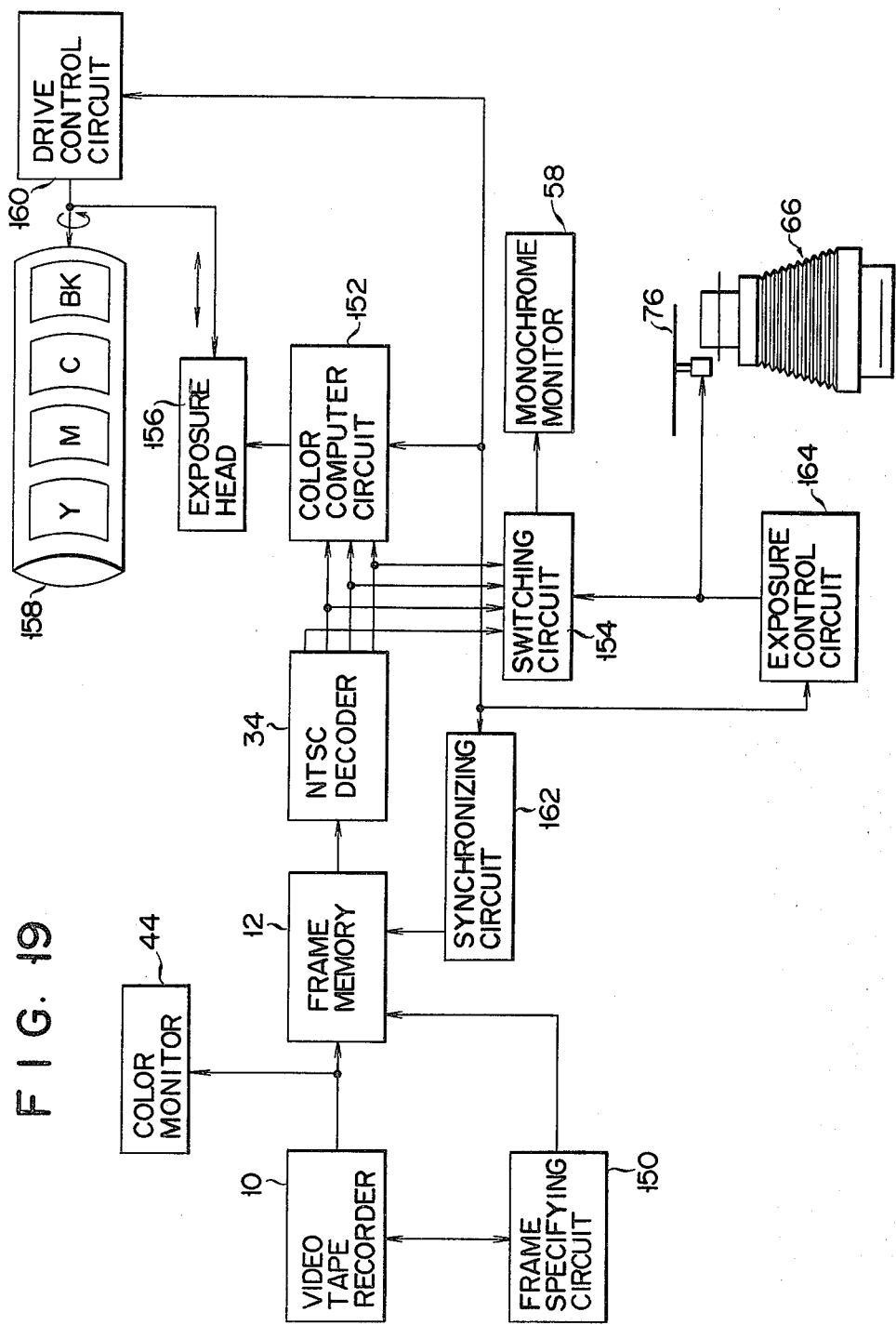
FIG. 19 is a block diagram illustrating a second embodiment of the present invention.

A second embodiment of the present invention will now be described hereinafter. This second embodiment is applicable for taking a photograph of a television picture and for making a printing plate from its television signal by driving an exposing head of an electronic color scanner. The plate can be made without taking a photograph of the television picture, and the resolving power of the plate is not degraded. Further, since photography of the same television picture is possible, the original of the color film may also be made for later use. FIG. 19 is a block diagram of the second embodiment and the same numerals denote the same parts as in FIG. 1. The video output signal of a VTR 10 is supplied to a frame memory 12 and a color monitor 44. A frame specifying circuit 150 as described above is connected to the frame memory 12 and the VTR 10 for frame specification. The output signal of the frame memory 12 is supplied to an NTSC decoder 34, and the four output signals of the NTSC decoder 34 are supplied to a color computer circuit 152 and a switching circuit 154. The color computer circuit 152 effects color correction, and the output of the color computer circuit 152 is supplied to an exposure head 156. A cylinder 158 on which are wound four black-and-white films (each corresponds to yellow, magenta, cyan and black printing plate) to be exposed is disposed before the exposure head 156. A drive control circuit 160 is connected to the exposure head 156 and the cylinder 158. The exposure head 156 is thereby displaced in the axial direction of the cylinder 158, and the cylinder 158 rotates about the axis.

The output signal of the switching circuit 154 is supplied to the monochrome monitor 58. A synchronizing circuit 162 is disposed and constructed to be locked by the output from the drive control circuit 160. The synchronizing circuit 162 controls the reading out operation of the frame memory 12, the operations of the color computer circuit 152, and an exposure control circuit 164 of a camera 66. The exposure control circuit 164 produces a change-over signal to the switching circuit 154 and a filter device 76.

The operation of this embodiment will be described hereinafter. The television picture signal of the specified frame is stored in the frame memory 12 as in the case of the first embodiment. The playback speed of the VTR 10 is 1/30 second for one frame. Since the rotational speed of the cylinder 158 of the electronic color scanner is 10 revolutions per second, the readout speed from the frame memory 12 must be changed so as to correspond to the rotational speed of the cylinder. Since the cylinder exposes 10 scanning lines per second, if one scanning line of the television picture image corresponds to one scanning line of the exposure head 156, it takes 52.5 seconds to expose 525 scanning lines. Thus, the frame memory 12 reads out the information stored at the speed of 1/30 second in 52.5 seconds. The exposure head 156 light-modulates the light emitted from a light source according to the three primary color signals obtained by the NTSC decoder 34 and exposes monochrome film on the cylinder 158. Separation plates of yellow, magenta, cyan and black are thus obtained. If the exposure head 156 is moved 500 lines/inch and the ratio of the 525 scanning lines of the television picture image and the moving speed of the exposure head 156 is 1:1, the size of the separation plates is each 26.7 mm×35.6 mm. Thus, for enlarging the dimensions of each separation plate to ten times the original dimensions, it suffices that 10 scanning lines of the exposure head 156 correspond to one scanning line of the television picture. A photograph is taken in the same manner as in the first embodiment. Four separation plates of the frame image stored in the frame memory are obtained and a color photograph corresponding to the frame image is obtained.

Although the above description has been made with respect to frame sequential exposure of one color after another, each scanning line may be read out for a line sequential exposure of 3×525=1,575 times instead of reading the image signal of one frame from the frame memory 12.

Furthermore, if the PAL system or the SECAM system is used instead of the NTSC system in the color television system, the wiring of the decoder and other parts may be modified for adaptation of the system.

What we claim is:

1. A photography apparatus for television picture comprising:
    video tape recorder means loaded with a video tape which is recorded with a television signal and a frame specifying signal recorded on a location corresponding to a predetermined frame component signal of the television signal, said means being adapted to detect said frame specifying signal during reproduction of the television signal;
    storing means connected to said video tape recorder means for storing the predetermined frame component signal of a reproduction output of the video tape recorder, when said video tape recorder means detects a frame specifying signal;
    decoder means connected to said storage means for causing the frame component signal stored in said storing means to be resolved into three primary color signals;
    monochrome television monitor means for producing a picture for each primary color signal which is generated from said decoder means; and
    photographing means having a film, lens and diaphragm and adapted to cause a picture formed by said monochrome television monitor means to be photographed in an out-of-focus state, the configuration of the diaphragm being longer in a first direction than in a second direction extending along the horizontal scanning line of said monochrome television monitor means, said first direction being orthogonal to said second direction, and the degree of the out-of-focus being such that a picture is defined within a depth of field when viewed in said second direction and outside the depth of field when viewed in said first direction.

2. An apparatus according to claim 1, wherein a low frequency signal of a frequency corresponding to a predetermined frame is recorded as the frame specifying signal on the video tape to be reproduced by said video tape playback means and said video tape playback means detects the frame specifying signal through a signal detector of the pass band corresponding to the predetermined frame.

3. An apparatus according to claim 1, wherein a pulse signal is recorded as the frame specifying signal on the video tape to be reproduced by said video tape playback means and said video tape playback means has a counter for counting said pulse signal and produces a detecting signal after counting a predetermined number of said pulses.

4. An apparatus according to claim 1, wherein said diaphragm is a rectangular aperture having sides shorter in said second direction.

5. An apparatus according to claim 1, wherein said diaphragm is a rectangular aperture having sides shorter in said second direction with the longer sides narrowed at the middle.

6. An apparatus according to claim 1, wherein said photographing means takes a multi-exposed color photograph on a single color film according to each primary signal on said monochrome monitoring means through color filters which pass only the respective primary color.

7. An apparatus according to claim 1, wherein said monochrome monitoring means is disposed in a black box.

8. An apparatus according to claim 1, wherein a screen of said monochrome monitoring means is coated in a multi-layered form of different refractive indexes so that the refractive index gradually changes from that of glass to that of air.

9. An apparatus according to claim 1, wherein said photographing means photographs only the central portion of a screen of said monochrome monitoring means.

10. An apparatus according to claim 1 further comprising a test signal generator connected to said monochrome monitoring means for measuring the brightness and contrast on a screen of said monitoring means.

11. An apparatus according to claim 1 further comprising an electronic scanner which in turn comprises means for modulating light emitted from a light source according to primary color signals of corresponding colors from said decoding means, and a plate making film to be exposed by the output of said modulating means.

12. An apparatus according to claim 1, wherein said frame specifying signal is recorded on that location of an audio track on a tape which corresponds to said predetermined frame component signal, and said video tape recorder means has a detecting head disposed on a tape travelling path a predetermined time ahead of an audio head to track an audio track, said predetermined time corresponding to a time taken for a tape to be moved in the reproduction of one field component signal of a television signal.

13. An apparatus according to claim 12, wherein said video tape playback means produces a detecting signal of said detecting head through a delay circuit corresponding to the path of tape travel between said audio head and said detecting head.

14. A photography apparatus according to claim 1, wherein said decoder means also resolves a luminance signal from said frame component signal stored and said photographing means takes, on a monochrome film, a monochrome photograph which corresponds to the picture of the luminance signal on said monochrome television monitoring means.

15. A photography apparatus according to claim 1, wherein said decoder means also resolves a luminance signal from said frame component signal stored and said photographing means provides originals for yellow, magenta, cyan and black printing plates which correspond to the pictures of the three primary color signals and the luminance signal on said monochrome television monitoring means, respectively.

* * * * *